(12) United States Patent
Claes et al.

(10) Patent No.: US 8,700,068 B2
(45) Date of Patent: Apr. 15, 2014

(54) METHOD FOR CHECKING THE PRESENCE OF A MOBILE DEVICE IN A CELL

(75) Inventors: Stan Claes, Bonheiden (BE); Stephen Parker, Antwerpen (BE)

(73) Assignee: Thomson Licensing (FR)

( * ) Notice: Subject to any disclaimer, the term of this patent is extended or adjusted under 35 U.S.C. 154(b) by 0 days.

(21) Appl. No.: 13/500,310

(22) PCT Filed: Sep. 29, 2010

(86) PCT No.: PCT/EP2010/064507
§ 371 (c)(1),
(2), (4) Date: Jun. 14, 2012

(87) PCT Pub. No.: WO2011/042347
PCT Pub. Date: Apr. 14, 2011

(65) Prior Publication Data
US 2012/0270570 A1    Oct. 25, 2012

(51) Int. Cl.
*H04W 24/00* (2009.01)
(52) U.S. Cl.
USPC ............. 455/456.5; 455/458; 455/456.1; 455/456.2
(58) Field of Classification Search
None
See application file for complete search history.

(56) References Cited

U.S. PATENT DOCUMENTS

| | | | | |
|---|---|---|---|---|
| 2002/0183075 A1* | 12/2002 | Fauconnier | | 455/456 |
| 2004/0224631 A1* | 11/2004 | Davis et al. | | 455/11.1 |
| 2007/0191010 A1* | 8/2007 | Kim et al. | | 455/436 |
| 2008/0207228 A1* | 8/2008 | Catovic et al. | | 455/458 |
| 2008/0305792 A1* | 12/2008 | Khetawat et al. | | 455/435.1 |
| 2010/0075658 A1* | 3/2010 | Hou et al. | | 455/422.1 |
| 2011/0110302 A1* | 5/2011 | Faurie et al. | | 370/328 |

FOREIGN PATENT DOCUMENTS

| | | |
|---|---|---|
| EP | 1353480 | 10/2003 |
| EP | 2034673 | 3/2009 |
| FR | 2880228 | 6/2006 |
| WO | WO95/20300 | 7/1995 |
| WO | WO2004/112354 | 12/2004 |

OTHER PUBLICATIONS

Search Report Dated Jan. 20, 2011.

\* cited by examiner

*Primary Examiner* — Suhail Khan
(74) *Attorney, Agent, or Firm* — Jack Schwartz and Associates, PLLC

(57) ABSTRACT

The present invention concerns a cellular base station and a method, at the cellular base station for checking the presence of a mobile device in a cell, the mobile device having previously camped on the cell, the method comprising sending a message to the mobile device for obtaining a connection request from the mobile device, and if a connection request is received, sending a connection reject message to the mobile device.

7 Claims, 3 Drawing Sheets

METHOD FOR CHECKING THE PRESENCE OF A MOBILE DEVICE IN A CELL

This application claims the benefit, under 35 U.S.C. § 365 of International Application PCT/EP2010/064507, filed Sep. 29, 2010, which was published in accordance with PCT Article 21(2) on Apr. 14, 2011 in English and which claims the benefit of European patent application No. 09447049.9, filed Oct. 8, 2009.

FIELD OF THE INVENTION

The present invention relates generally to device detection in a cell and in particular to a method in a femtocell to detect a mobile device.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A macrocell is a cell in a mobile phone network that provides radio coverage served by a cellular base station, namely a NodeB in a universal mobile telecommunication system (UMTS) network. It is adapted to connect cellular handsets, also called User Equipment or UE, to a mobile network. The area covered by a base station is called a cell. When a UE is located in a cell, it can connect to the base station.

A femtocell, also called an access point base station or a Home Node B, is a cellular base station. From a mobile handset, it is functionally similar to a macrocell cellular base station. A femtocell is adapted to cover a much lower cell range than a macrocell. The cell size covered by a femtocell is called a femtocell hereinafter. A typical use of a femtocell is inside a building to cover areas that are not reached by a macrocell. A cellular service operator provides a plurality of macrocells and femtocells.

When a UE wishes to camp on a cell it performs a location update procedure, as specified in Section 4.1 of 23.012 standard indicated hereinafter, which alerts the base station to the presence of the UE. However, after this point the base station has no knowledge to the continued presence of the UE in the cell. The UE can possibly initiate a signaling connection towards the base station; it performs a periodic location update or is involved in establishing a connection to the core network. If a UE leaves a cell and camps on a new cell, the current base station is unaware that the UE is no longer under its control.

Under normal circumstances the presence of a UE within a given cell is not important as the Core Network keeps track of the UE. But in a situation where a cell wishes to offer services which depend on knowledge of the presence of a UE this information is valuable.

SUMMARY OF THE INVENTION

The present invention attempts to remedy at least some of the concerns connected with the prior art, by providing a method for checking the presence of a UE in the cell.

The present invention concerns a method at a cellular base station for checking the presence of any mobile device in a cell, the mobile device having previously camped on said cell.

To this end, the invention relates to a method comprising the steps of sending a message to the mobile device for obtaining a connection request from the mobile device, and if a connection request is received, sending a connection reject message to the mobile device.

Advantageously, the method of the invention doesn't require any modification to the UE. It permits to check the presence of any UE compliant to the standard.

According to an embodiment of the invention, the connection is a RRC Connection.

According to an embodiment of the invention, the message is a paging type 1 message.

According to an embodiment of the invention, the connection reject message is a RRC Connection Reject message with the Parameters "Rejection Cause=unspecified" and "Wait Time=0".

According to an embodiment of the invention, the cellular base station comprises a memory storing a list of previously camped devices database, and the method comprises the step of, if no connection request is received, removing the mobile device from the previously camped device database list.

According to an embodiment of the invention, the method comprises the steps of prior to sending the message to the mobile device, receiving a request from an application for verifying the presence of the UE, and after receiving a connection request or not, informing the application on the presence of the UE.

Another object of the invention is a cellular base station comprising a memory for registering a previously camped mobile device to the cell, and presence checking means for checking the presence of the mobile device in the cell by sending a message to the mobile device for obtaining a connection request from the mobile device, and if a connection request is received, sending a connection reject message to the mobile device.

According to an embodiment of the invention, the presence checking means are adapted to receive a request from an application for checking the presence, and to send a response to the application to inform on the presence.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which.

Figure 2:
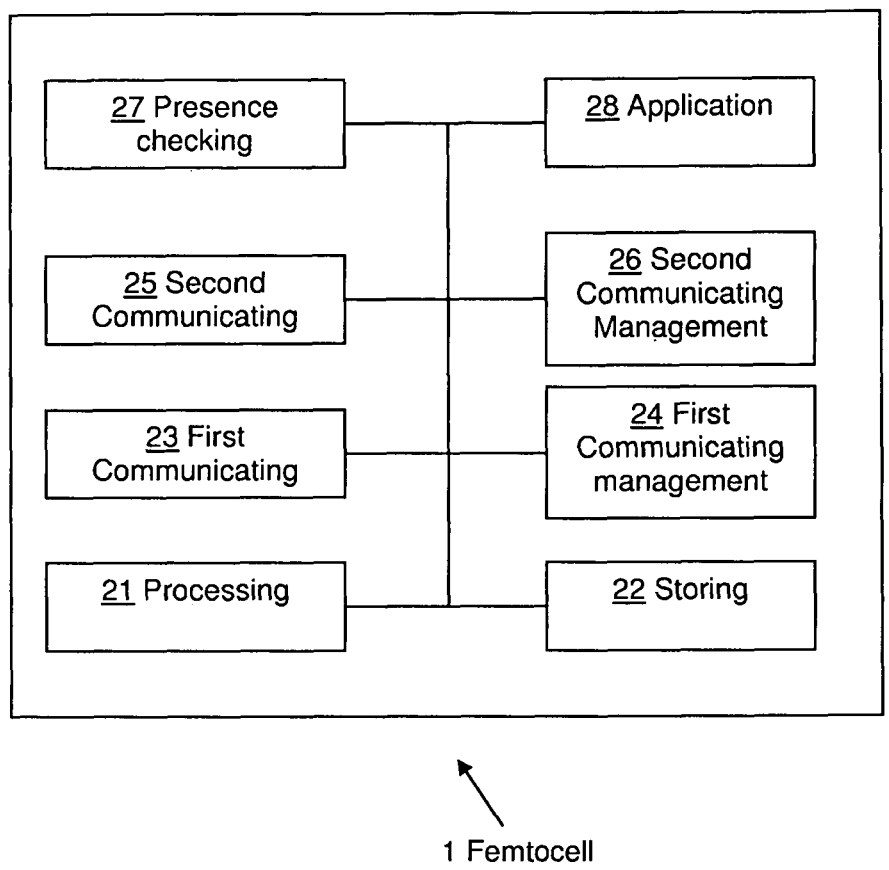
FIG. 2 shows a femtocell device according to the embodiment.

In the FIG. 2, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

The exemplary embodiment comes within the framework of a femtocell device, but the invention is not limited to this particular environment and may be applied within a macro-cell base station.

The radio resource control configuration is specified in the 3GPP 25.331 standard, version 8.7.0 (2009-06) on 3rd Generation Partnership Project; Technical Specification Group Radio Access Network; Radio Resource Control (RRC); Protocol Specification (Release 8), and noted 25.331 hereinafter.

The Location Update procedure is specified in the 3GPP 23.012 standard, version 8.1.0 (2008-12) on 3rd Generation Partnership Project; Technical Specification Group Core Network and Terminal; Location management procedures (Release 8), and noted 23.012 hereinafter.

The idle mode procedures are specified in the 3GPP 25.304 standard, version 8.6.0 (2009-06) on 3rd Generation Partnership Project;

Technical Specification Group Radio Access Network; User Equipment (UE) procedures in idle mode and procedures for cell reselection in connected mode (Release 8), and noted 25.304 hereinafter.

Figure 1:
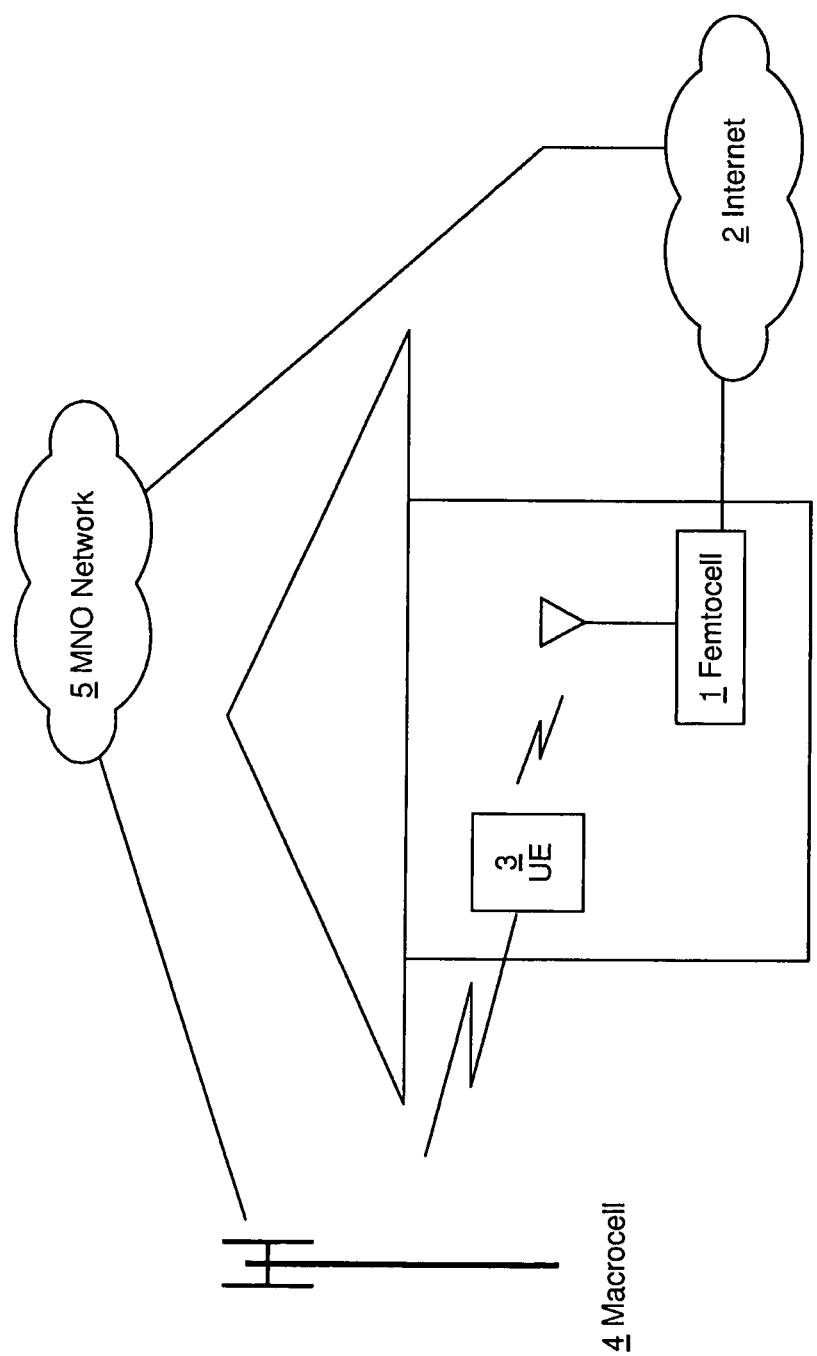
FIG. 1 represents a system according to the embodiment.

The present embodiment concerns a femtocell in a system as illustrated in FIG. 1. The femtocell 1 is connected to the service provider network, also called the mobile network operator network 5, through a broadband connection. In the embodiment, the broadband connection is a digital subscriber line connection that provides connection to the Internet 2. The femtocell 1 located in the home environment is connected to the Internet 2 through a digital subscriber line gateway not represented. The femtocell device is a standalone device. Of course the femtocell might also be embedded in such a gateway. The femtocell enables to connect a UMTS compatible user equipment 3, noted UE hereinafter. When connected to the femtocell, the UE accesses the MNO network through the Internet. The UE 3 may also be connected to the MNO network through a macrocell 4 in a manner well known per se.

The femtocell device according to the embodiment is represented in FIG. 2. It comprises a first communicating module 23 for emitting and receiving in the UMTS network. In particular the first communicating module is a 3G radio emitter-receiver. More generally, this is a mobile networking interface. A first communicating management module 24 is adapted to perform the management and control functions of the first communicating module. The femtocell device also comprises a second communicating module 25 for emitting and receiving in the broadband network. A second communicating management module 26 is adapted to perform the management and control functions of the second communicating module. In the embodiment, the broadband network is of digital subscriber line technology. Of course it could also be any other type of broadband connection, such as a cable, fiber optics or satellite. The femtocell device also comprises storing module 22 such as a memory for storing among others the list of UE identifiers as indicated hereinafter. The femtocell device also comprises a processor 21 that is adapted to execute the algorithm of the embodiment.

Figure 3:
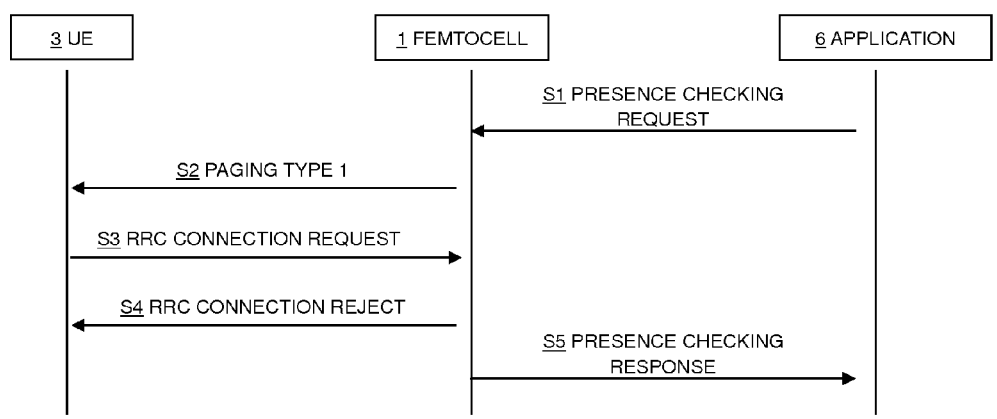
FIG. 3 illustrates a flow chart of the method according to the embodiment.

The femtocell device according to the embodiment comprises a Presence Checking module 27 for verifying the presence of a UE in the cell. When a UE has camped on a cell, its identifier is stored in the memory 22. Sections 4 and 5 of 25.304 describe "Camping on", Section 5.2.2 gives a diagrammatic overview of UE behaviour in what is termed "idle mode". The femtocell device determines if a UE that has previously camped-on the cell is still present. It uses signaling as indicated in FIG. 3 hereinafter.

The presence checking module 27 is triggered by an application 28 located in the femtocell device. That application 28 needs to know whether a UE is present in the cell to launch a service to that UE. When the application asks the presence checking module 27 about the presence of the UE, the presence checking module verifies the presence of the UE as indicated hereinafter, and informs the application accordingly. If the UE is present, the application may then run the service to the UE.

An example application according to the embodiment is an home automation application. That application configures the home heating according to the presence or the absence of an end user at home. The end user is detected based on its UE. If the femtocell detects the UE, it means that the end user is at home. Any home automation applications based on the end user presence at home may trigger the presence checking module.

More generally any remote application 6 may also trigger the presence checking module to implicitly verify the presence of an end user in the home. The remote application 6 could be located in a remote device, either located in the home or on a remote network such as the Internet 2. That remote application sends requests to the presence checking module 27 for checking verifying the presence of UEs.

The signaling procedure for checking the presence of a EU in the cell, on request of a remote application 6, is illustrated in FIG. 3. A remote application 6 triggers the procedure by sending a request S1 to the femtocell for checking the presence of a UE. The femtocell device sends a Paging Type 1 message S2 to a UE that has previously "camped-on" the cell. The message is configured so that it elicits a Radio Resource Control connection request, RRC connection request, from the UE. Sections 8.1.2, 8.1.3, and 8.1.4 of 25.331 describe the paging procedure and the subsequent RRC connection procedure.

On receipt of the Paging Type 1 message the UE responds with an RRC Connection Request S3. The receipt of this message by the femtocell device is sufficient to indicate to the femtocell device that the UE is still present in the cell. On receipt of the RRC Connection Request the femtocell device responds with a RRC Connection Reject message S4 with the Parameters "Rejection Cause=unspecified" and "Wait Time=0".

If the UE does not respond to the Paging message the femtocell device assumes that the UE is no longer present. The femtocell device can then remove the UE identifier from the memory 22.

Alternatively, the UE can repeat the procedure until a maximum number of repetitions.

Alternatively, the UE comprises two lists of UEs in the memory. A first list contains the identifier of the UEs that previously camped on the cell. A second list contains the identifier of the UEs that are identified as being present in the cell. When a UE doesn't respond to the Paging message, its identifier is removed from the second list but not removed from the first list. The femtocell then keeps a track of all the previously camped UEs.

The femtocell then sends a response S5 to the remote application 6 to indicate the whether the UE is present or not in the cell.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method, at a cellular base station covering a cell, the cellular base station comprising a memory for storing an identifier of a mobile device identified as a camped mobile device, said method comprising:
   sending a message to said mobile device for determining if said mobile device is present in said cell, said message eliciting said mobile device to send a connection request;
   if, in response to said eliciting message, a connection request is received from said mobile device, sending a connection reject message to said mobile device, and
   if, in response to said eliciting message, no connection request is received from said mobile device, removing said mobile device from a list of previously camped mobile devices.

2. Method according to claim 1, wherein said connection is a RRC (Radio Resource Control) Connection.

3. Method according to claim 1, wherein said message eliciting said mobile device to send a connection request is a paging type 1 message.

4. Method according to claim 1, wherein said connection reject message is a RRC (Radio Resource Control) Connection Reject message with Parameters "Rejection Cause=unspecified" and "Wait Time=0".

5. Method according to claim 1, comprising,
   prior to sending said message eliciting said mobile device to send a connection request, receiving a request from an application for verifying the presence of said mobile device, and
   after receiving a connection request or not, informing said application on the presence of said mobile device.

6. A cellular base station covering a cell comprising:
   a memory for storing an identifier of a mobile device identified as a camped mobile device,
   presence checking means for sending a message to said mobile device for determining if said mobile device is present in said cell, said message eliciting said mobile device to send a connection request, if in response to said eliciting message a connection request is received from said mobile device, sending a connection reject message to said mobile device, and if in response to said eliciting message no connection request is received from said mobile device, removing said mobile device from a list of previously camped mobile devices.

7. Cellular base station according to claim 6, wherein said presence checking means are configured to receive a request from an application for checking a presence of said mobile device, and to send a response to said application to inform on the presence.

* * * * *